Feb. 8, 1927.  E. C. MOORE  1,617,164
ICE CARD
Filed March 8, 1923
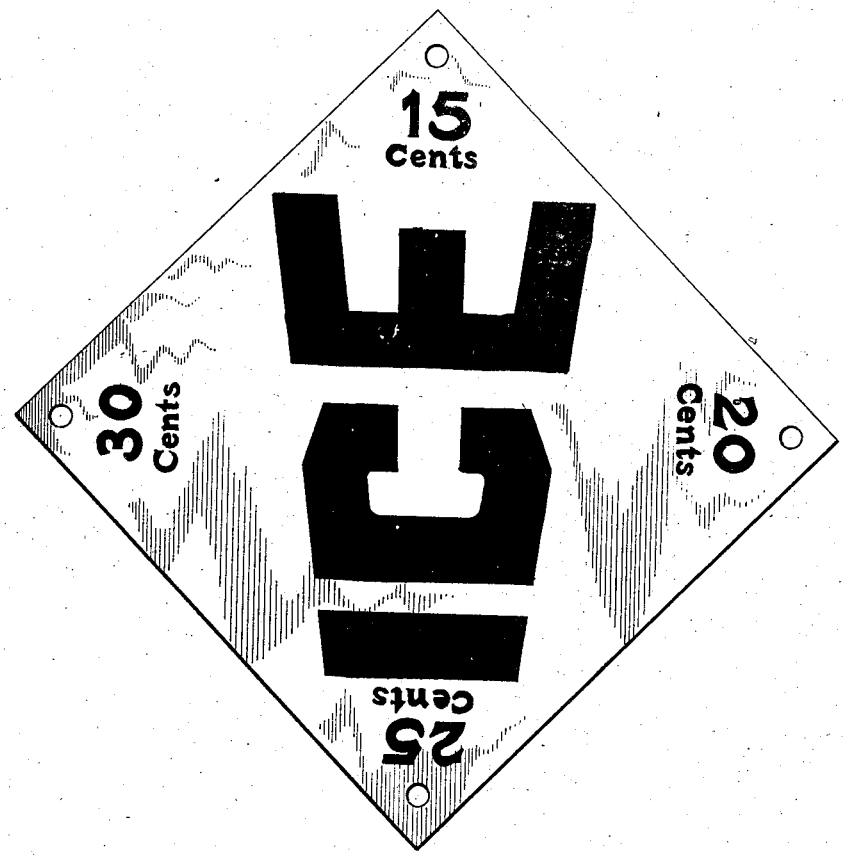
E. C. Moore
Inventor
By John Boyle Jr
Attorney Patented Feb. 8, 1927.

1,617,164

UNITED STATES PATENT OFFICE.

EDWARD C. MOORE, OF LOS ANGELES, CALIFORNIA.

ICE CARD.

Application filed March 8, 1923. Serial No. 623,679.

My invention relates to a display card or sign and one of the objects of the invention is to provide an arrangement of printed matter on the card, which can be used for the purpose of imparting different types of information. One embodiment is that shown in the drawings in connection with an ice card. The principle involved in the arrangement of this printed matter on the card is such, that depending on the position of the word "Ice" the party delivering the ice, can tell at a distance how much the consumer desires delivered.

Fig. 1 is a view of an ice card made preferably of stiff paper board. At each corner, an aperture may be provided for suspending the card in different positions. In each corner also, suitable indicia may be printed, indicating the price of different quantities of ice.

The word "Ice" is written in letters of different and graduated size so that the printed mass in this particular instance, is trapezoidal in shape. The appearance of the general mass at a distance is that of a block V. Depending entirely on whether the V is upright, upside down, or pointing to the right or the left, the iceman, knowing intimately the location of the price figures with respect thereto, can tell how much ice he is expected to deliver.

The word "Ice" can be similarly printed on both sides of the card, except that one side is printed in black and the other side in red. By using different price marks on each side in the corners, the utility of the card is doubled by this expedient.

From the above description it will be apparent that I have produced a device of the character specified and which while particularly adapted for use in connection with the sale of ice as the preferred form of the invention, it will be understood that I reserve the right to all changes properly falling within the scope and spirit of the appended claims.

Therefore what I claim as new and desire to secure by Letters Patent is:

1. A display card having a word printed thereon in letters of different and graduated size to produce an unsymmetrical block effect, a plurality of other varying information imparting items printed adjacent said word, the different reading positions of said word indicating which one of the said items of information it is desired to impart.

2. An ice card having the word "Ice" printed thereon in letters of different and graduated size to produce a block V effect, different price marks printed on the card above, below and to the right and left of the said word and in smaller size type, the said card adapted to be supported in different reading positions in which the said block V will appear upright, inverted or pointing to the right or left.

In testimony whereof I affix my signature.

EDWARD C. MOORE.